United States Patent
Wei et al.

(10) Patent No.: US 9,532,245 B2
(45) Date of Patent: Dec. 27, 2016

(54) ENHANCEMENT OF IN-DEVICE INTERFERENCE

(75) Inventors: Na Wei, Beijing (CN); Haiming Wang, Beijing (CN); Wei Hong, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 117 days.

(21) Appl. No.: 14/400,284

(22) PCT Filed: May 10, 2012

(86) PCT No.: PCT/CN2012/075310
§ 371 (c)(1),
(2), (4) Date: Nov. 10, 2014

(87) PCT Pub. No.: WO2013/166690
PCT Pub. Date: Nov. 14, 2013

(65) Prior Publication Data
US 2015/0105122 A1 Apr. 16, 2015

(51) Int. Cl.
*H04B 7/00* (2006.01)
*H04W 24/04* (2009.01)
*H04W 88/06* (2009.01)

(52) U.S. Cl.
CPC ............ *H04W 24/04* (2013.01); *H04W 88/06* (2013.01); *Y02B 60/50* (2013.01)

(58) Field of Classification Search
None
See application file for complete search history.

(56) References Cited

U.S. PATENT DOCUMENTS 5,913,176 A * 6/1999 Barabash ............... H04W 84/14
455/433
8,374,633 B2 * 2/2013 Frank .................... G01S 5/0215
455/414.1

(Continued)

FOREIGN PATENT DOCUMENTS

CN 102143521 A 8/2011
CN 102170644 A 8/2011

(Continued)

OTHER PUBLICATIONS

3GPP TR 36.816 V11.2.0, Release 11, 3rd Generation Partnership Project, Technical Specification Group Radio Access Network, Evolved Universal Terrestrial Radio Access (E-UTRA); Study on signalling and procedure for interference avoidance for in-device coexistence. 3GPP Organizational Partners. Dec. 2011, 2011-2012 (44 Pages).

*Primary Examiner* — Dominic Rego
(74) *Attorney, Agent, or Firm* — Oblon, McClelland, Maier & Neustadt, L.L.P.

(57) ABSTRACT

Disclosed are apparatuses, methods and computer program instructions which receive or detect an in-device coexistence interference condition change in a user equipment equipped with a plurality of transceivers, send an indication of the in-device coexistence interference condition change to an access point and receive a media access control element configured for muting/unmuting at least one of a plurality of transceivers from the access point. The condition of in-device coexistence interference relates to interference among transceivers such as a long term evolution advanced transceiver and a Bluetooth transceiver in the same user equipment. The media access control element can be con- (Continued)

figured to either promote a measurement gap pause or short discontinuous transmission during a condition of in-device coexistence interference.

17 Claims, 6 Drawing Sheets

(56) References Cited

U.S. PATENT DOCUMENTS

| | | | |
|---|---|---|---|
| 8,818,345 B1* | 8/2014 | Shah .................. | H04M 3/561 |
| | | | 455/416 |
| 2012/0230271 A1* | 9/2012 | Kim ................... | H04L 5/0007 |
| | | | 370/329 |
| 2013/0023295 A1* | 1/2013 | Kasslin .............. | H04W 48/14 |
| | | | 455/501 |

FOREIGN PATENT DOCUMENTS

| | | |
|---|---|---|
| CN | 102378192 A | 3/2012 |
| WO | 2012119487 A1 | 9/2012 |

* cited by examiner

ENHANCEMENT OF IN-DEVICE INTERFERENCE

TECHNICAL FIELD

The example and non-limiting embodiments of this invention relate generally to wireless communication systems, methods, devices and computer programs, and more specifically relate to avoiding in-device interference in user equipment that are equipped with multiple radio transceivers.

BACKGROUND

Increasingly, user equipment (UE) include multiple radio transceivers to access various networks and services ubiquitously. As shown in FIG. 1, a transceiver module 100 is capable of including multiple transceivers in a UE which may include co-located transceivers for employing long term evolution (LTE) 110, global navigation satellite system (GNSS) 120, and Bluetooth™ (BT)/WiFi™ radio 130 access technologies (RATs). FIG. 1 is but one example of co-located RATs in a UE other configurations are possible which may include more or less co-located transceivers as well as deploying other RATs. (for example a Zigbee transceiver). Due to the extreme proximity of the transceivers and the fact that each radio technology is capable of operating on the same frequency bands each transceiver may interfere with the transmitting and receiving of another transceiver within the same UE. Some non-limiting examples of frequencies bands capable of being used by multiple RATs are the Industrial, Scientific and Medical (ISM) on bands of 2400~2483.5 MHz or the so-called "TV White Space" recently designated as unlicensed spectrum in the United States on bands of 300 MHz to 400 MHz. For example, an LTE transceiver 110 operates at Band 40 (2300~2400 MHz) in time division duplex (TDD) Mode and Band 7 uplink (UL) (2500-2570 MHz) operates in frequency division duplex (FDD) Mode. While on the same frequency spectrum, a BT transceiver 130 operates seventy-nine (79) channels of 1 MHz each in the ISM band in the range of 2402~2480 MHz. Accordingly, if a UE employs both radio technologies (BT and LTE), simultaneous interference may occur. As used throughout this disclosure, this interference among co-located transceivers in a UE is referred to as in-device coexistence (IDC) interference.

There is an ongoing study item in Radio Access Network 2 (RAN2) which is exploring possible solutions to IDC interference. See. 3GPP TR 36.816 V11.2.0 Technical Specification Group Radio Access Network; Evolved Universal Terrestrial Radio Access (E-UTRA); Study on Signaling and Procedure for Interference Avoidance for In-Device Coexistence, December 2011 Technical Report. Among the significant usage scenarios examined by the RAN 2 study are: (1) interoperability of LTE voice over IP (VoLTE) via a LTE transceiver where the voice traffic is transmitted and received by a BT transceiver deployed in an earphone or BT headset (VoIP service); and (2) interoperability of a LTE transceiver in a scenario where multimedia (for example a high-definition (HD) video) is downloaded by the LTE receiver and the audio is routed to a BT headset, and where the traffic activity between the LTE and the BT are correlated. It is noted that a transmission latency of more than 60 ms can cause audio playback problems at the BT receiver.

Among the promising, but not yet realized solutions for IDC interference have focused on radio resource control (RRC) signal manipulation undertaken by the UE in the RRC_CONNECTED state employing a time division multiplexing (TDM) solution. Two possible methods of accomplishing this TDM approach have been suggested: a discontinuous reception (DRX) approach, and a measurement gap (MG) approach. Each approach suggests muting or limiting the duration of LTE transmissions to give another in-device RAT access to the ISM frequency spectrum.

The DRX approach exploits DRX's functionality which can define a period of reduced power consumption of the UE. That is, the UE checks the downlink channel periodically so as to wake up only when downlink traffic is detected, but remains in the sleep mode state when no downlink traffic is detected. As such, the UE can apply DRX to essentially "switch off" its LTE receiver in order to preserve battery power.

In LTE there is a relationship between DRX functionality and the two possible RRC states in the UE. That is, different DRX functionality applies to UEs which are in RRC_CONNECTION state as opposed to RRC_IDLE state. Importantly, when in RRC_CONNECTED state, the UE does not need to monitor the downlink channels. DRX functionality includes DRX cycles which consist of an 'On Duration' during which the UE should monitor the packet data control channel (PDCCH), and a "DRX period" during which a UE can skip reception of downlink channels for battery saving purposes. These designations of the DRX cycles involves a trade-off between battery saving and latency. On the one hand, a long DRX period can be beneficial (i.e. in that it helps preserve the battery) On the other hand, a shorter DRX period provides for a faster response when data transfer is resumed.

To respond to these conflicting goals, LTE provides two DRX cycles, a short cycle and a long cycle, which can be configured for each UE in order to promote power saving in both the RRC_CONNECTED and RRC_IDLE states. The transition between a short DRX cycle, a long DRX cycle, and continuous reception is controlled by a DRX timer in the TIE.

The MG approach exploits known inter-frequency measurements (e.g., cell identification) performed during periodic measurement gaps ("idle gaps") where the UE does not receive any download data. However, if the UE has more than one receiver it can receive on the alternative receiver. That is, two possible gap patterns can be configured by the network which are always 6 ms long in downlink (DL) situations and 7 ms long in uplink (UL) situations with a periodicity of 40 ms or 80 ms, respectively. For IDC purpose, shorter new gap patterns may be designed, and the new gap pattern may be called "IDC gaps". Throughout this document, we still use measurement gap to keep it general, but it mainly refers to IDC gaps. Like DRX, there is a trade-off between gap patterns such as shorter or longer cell identification delay versus a greater or lesser interruption in data transmission and reception.

As mentioned above, the RAN 2 study focused upon a TDM solution which avoids transmission latency in the BT transceiver (<60 ms) in order to avoid the audio playback problem in a BT headset as described above. As shown in FIG. 2, TDM solutions (200) can be configured such that they have a scheduled period (220) and an unscheduled period (230) which do not exceed 60 ms and have a pattern periodicity (210) of 120 ms.

The following abbreviations that may be found in the specification and/or the drawing figures are defined as follows:

3GPP third generation partnership project
AP access point

BT Bluetooth™
CE control element
CIDS coexistence information and discovery server
DL downlink
DL-SCH downlink shared channel
DP data processor
DRX discontinuous reception
eNodeB base station of an LTE/LTE-A system
eSCO extended synchronous connection oriented
EUTRAN evolved UMT terrestrial radio access network,
FDM frequency division multiplexing
GSM global system for mobile communications
GNSS global navigation satellite system
GP gap pattern
GPS global positioning system
HSPA high speed packet access.
ID identifier
IDC in-device coexistence
IP internet protocol
ISM industrial, scientific and medical
LCID logical channel ID field
LTE long term evolution (of the evolved UTRAN system)
LTE-A long term evolution-advanced
MAC medium access control
MG measurement gap
PUCCH physical uplink control channel
SCO synchronous connection oriented link
TDD time division duplex
TDM time division multiplexing
RAN radio access network
RAT radio access technologies
RRC radio resource control
UE user equipment
UL uplink
UMT universal mobile telecommunications
UTRAN universal terrestrial radio access network
WCDMA wideband code division multiple access
WLAN wireless local area network

SUMMARY

In a first example embodiment of the invention there is an apparatus comprising at least one processor and at least one memory which stores a computer program. In this embodiment, the at least one memory with the computer program is configured with the at least one processor to cause the apparatus to at least receive or detect an in-device coexistence interference condition change in a user equipment equipped with at least a plurality of transceivers, send an indication of the in-device coexistence interference condition change to an access point and receive a media access control element configured for muting/unmuting at least one of a plurality of transceivers from the access point.

In a second example embodiment of the invention there is a method comprising receiving or detecting an in-device coexistence interference condition change in a user equipment equipped with at least a plurality of transceivers, sending an indication of the in-device coexistence interference condition change to an access point and receiving a media access control element configured for muting/unmuting at least one of a plurality of transceivers from the access point.

In a third example embodiment of the invention there is a computer readable memory which stores a computer program, in which the computer program comprises receiving or detecting an in-device coexistence interference condition change in a user equipment equipped with at least a plurality of transceivers, sending an indication of the in-device coexistence interference condition change to an access point and receiving a media access control element configured for muting/unmuting at least one of a plurality of transceivers from the access point.

In a fourth example embodiment of the invention there is a means for receiving or detecting a first in-device coexistence interference condition change in a user equipment equipped with at least a plurality of transceivers, receiving or detecting an in-device coexistence interference condition change in a user equipment equipped with a plurality of transceivers, sending an indication of the in-device coexistence interference condition change to an access point and receiving a media access control element configured for muting/unmuting at least one of a plurality of transceivers from the access point.

In a fifth example embodiment of the invention there is an apparatus comprising at least one processor and at least one memory which stores a computer program. In the this embodiment, the at least one memory with the computer program is configured with the at least one processor to cause the apparatus to at least receive an indication of in-device coexistence interference condition change from a user equipment equipped with at least a plurality of transceivers and send a media access control element configured for muting/unmuting at least one of a plurality of transceivers in the user equipment.

In an sixth example embodiment of the invention there is a method comprising receiving an indication of in-device coexistence interference condition change from a user equipment equipped with at least a plurality of transceivers and sending a media access control element configured for muting/unmuting at least one of a plurality of transceivers in the user equipment.

In a seventh example embodiment of the invention there is a computer readable memory which stores a computer program, in which the computer program comprises receiving an indication of in-device coexistence interference condition change from a user equipment equipped with at least a plurality of transceivers and sending a media access control element configured for muting/unmuting at least one of a plurality of transceivers in the user equipment.

In an eighth example embodiment of the invention there is a means for receiving an indication of in-device coexistence interference condition change from a user equipment equipped with at least a plurality of transceivers and means for sending a media access control element configured for muting/unmuting at least one of a plurality of transceivers in the user equipment.

These and other embodiments and aspects are detailed below with particularity.

The foregoing and other aspects of the example embodiments of this invention are further explained in the following Detailed Description, when read in conjunction with the attached Drawing Figures.

DETAILED DESCRIPTION

Figure 1:
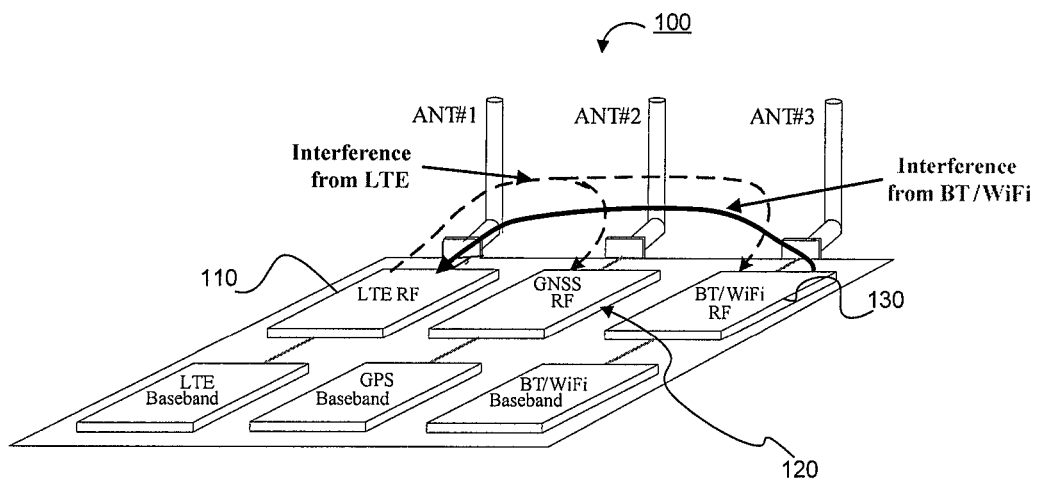
FIG. 1 reproduces FIG. 4.1 of 3GPP TS 36.816 and shows interference between co-located radio transceivers within the same user equipment.

The example embodiments of this invention provide apparatus, methods, and computer programs that provide improved efficiency for managing Bluetooth (BT) in-device co-existence (IDC) with an LTE device employing predictable time division multiplexing (TDD) scheduling. In particular, some example embodiments of the present invention employ short discontinuous reception (DRX) or measurement gap (MG) to mute/unmute LTE transmissions in a UE to allow for BT transmission on the ISM bands in the same UE during predictable scheduled and unscheduled LTE periods. In one embodiment, short DRX is engaged in a UE to manage IDC for the benefit of BT, such that pausing and/or restarting of short DRX and entering and/or exiting of long DRX is initiated by a newly defined, explicit media access control (MAC) control element (CE) rather than by employing a DRX timer. In an alternative embodiment, MG is engaged in a UE to manage IDC for the benefit of BT, such that pausing and/or restarting of MG is initiated by a newly defined, explicit MAC CE.

As described in more detail below, the present invention exploits Bluetooth's sniff mode and/or synchronous connection oriented (SCO) link start/end to reduce signaling. That is, the present invention allows for more efficient coordination among LTE and BT signaling, and recognizes that a single BT transmission might be longer than currently specified short DRX timer values, for example. As such, the present invention eliminates the use of a DRX timer as required in the prior art (for example, in the prior art the shortDRX timer needs to be restarted from time to time with DRX MAC CE). Accordingly, RRC de_configurations and re_configurations are reduced, for example.

(a) Bluetooth Sniff Mode for ACL Link and SCO/eSCO Link

Bluetooth provides different types of physical channels, such as synchronous connection oriented (SCO), extended synchronous connection oriented (eSCO) and asynchronous connection less (ACL) connection. SCO channels are used for voice transfer by reserving slots and are symmetric between the master and slave. There are a maximum of three in a piconet, with a slave being able to control two originating from different masters. One can use the voice packets or mixed voice/data packets. eSCO, unlike SCO, allows retransmission of eSCO packets employing a secondary set of LT_ADDR assigned to the eSCO slaves. Sniff mode does not affect the SCO or eSCO links that may be active. And the BT master can coordinate with a slave to initiate and end SCO or eSCO links.

An ACL channel supplies an asynchronous access between master and slave (a single channel per pair), with the slot as the base only when the data packets are used. In addition, a slave can transmit only after having received a packet from the master (the following slot). For this purpose, the master can send polling packets to the slaves (when there is nothing more asynchronous to transmit).

The Bluetooth™ Core Specification, Version 4.0 (adopted June 2010), describes three low power modes: the hold, park and sniff modes. The three low power modes can be thought of as "sleep modes", somewhat similar in functionality to LTE's DRX or MG functions. This is in converse to BT's active mode, in which the Bluetooth module transmits on the transmission channel. As such, a BT master in a piconet regularly sends a packet to the slave devices (a process known as "polling") to enable the slaves to be able to send a packet to the master and/or re-synchronize themselves.

To enter sniff mode, a master and slave in a Bluetooth piconet negotiate a sniff interval $T_{sniff}$ and a $sniff_{offset}$, $D_{sniff}$, that specifies the timing of the sniff slots. To initiate sniff mode, either the master or the slave sends an LMP_sniff_req PDU together with the timing control flags, $D_{sniff}$, $T_{sniff}$, a $N_{sniff\ attempt}$ and a $N_{sniff\ timeout}$. The requested device replies with an LMP_accept PDU. $D_{sniff}$ determines the time of the first slot and, after that, the sniff slots follow periodically with the sniff interval $T_{sniff}$. As mentioned above, two parameters control the listening activity in the slave: the $N_{sniff\ attempt}$ and $N_{sniff\ timeout}$. $N_{sniff}$ attempt determines how many slots the slave will listen to when the slave is not treating this as a scatternet link, beginning at the sniff slot, even if it does not receive a packet with its own LT_ADDR. $N_{sniff\ timeout}$ determines how many additional slots the slave will listen to when the slave is not treating this as a scatternet link, if it continues to receive only packets with its own LT_ADDR. It is not possible to modify the sniff parameters while the device is in sniff mode.

To exit sniff mode either the master or the slave sends an LMP_unsniff_req PDU. The requested device replies with an LMP_accept PDU to exit sniff mode and enter active mode.

Figure 3:
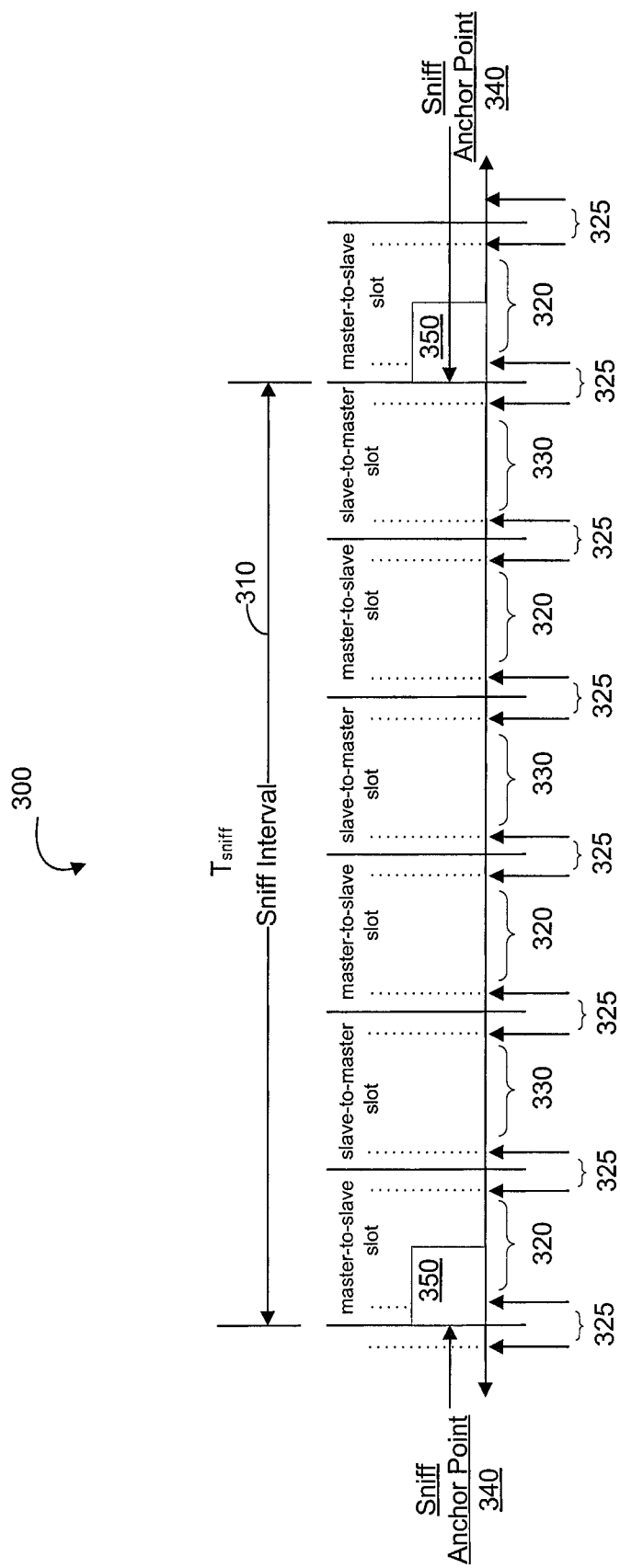
FIG. 3 is an illustration of a Bluetooth™ sniff interval for use in some example embodiments of the present invention.

Referring now to FIG. 3, an example of a BT sniff ($T_{sniff}$) interval 300 is depicted in accordance with the BT Core Specification Version 4.0 (Jun. 30, 2010) and configured for use in some example embodiments of the present invention. As can be appreciated from FIG. 3 and the disclosure below, in sniff mode the duty cycle of a slave's activity can be reduced. That is, the $T_{sniff}$ 310 begins and ends at variable and predetermined sniff anchor points 340. Time slots designated as either master-to-slave 320 or slave-to-master 330 are ordered sequentially between each $T_{sniff}$ 310. Unlike the situation in BT active mode, the slave listens to every ACL slot 350 in the master traffic at the predefined sniff anchor points 340 where each slot is 625 µs in length. Accordingly, with sniff mode, the time slots are reduced when the slave is listening, so that the master transmits to the slave only in specific time slots. Sniff anchor points 340 are spaced regularly within the interval designated $T_{sniff}$ 310. The slave listens during master-to-slave transmission slots 320, starting at the sniff anchor point 340. Also as shown in FIG. 3, uncertainty windows 325 are provided which are approximately less than or equal to 20 μs in length (10 μs before a slot boundary and 10 μs after the boundary). The Bluetooth Core Specification suggests that a slave device in normal operation should use an uncertainty window 325. That is, if no packet addressed to the slave is detected in that window, the slave ceases listening and waits until the next window (two slots later). BT's sniff mode can be configured with an sniff interval $T_{sniff}$ range between 40 ms to 1.28 s.

(b) MAC CE

In LTE, the downlink (DL) multiplexing and logical channel priorization is left to eNodeB implementation. The uplink (UL) on the other hand, is left to the UE which creates a media access control (MAC) packet data unit (PDU) to transmit using the allocated radio resources (which is standardized in 3GPP TR 36.321). A MAC PDU includes of a MAC payload part and a MAC header part. The MAC header contains MAC subheaders. The MAC payload contains MAC control elements (CE), MAC service data units (SDUs) and padding. The subheader consists of a logical channel ID (LCID) and a length field. In operation, the UE determines the amount of data to be transmitted on each logical channel for each MAC PDU and may include allocated space for a MAC control element (CE). MAC CEs are used for MAC-level peer-to-peer signaling. The available types of MAC CE include: (1) buffer status report (BSR); (2) power headroom; (3) DRX command; (4) timing advance command; (5)C-RNTI; (6) UE contention resolution identity; and (7) MBMS dynamic scheduling information. For each MAC CE, one specific LCID index is allocated as set forth in subclause 6.2.1 of 3GPP TS 36.321 v. 10.5.0 (March 2012).

Figure 4:
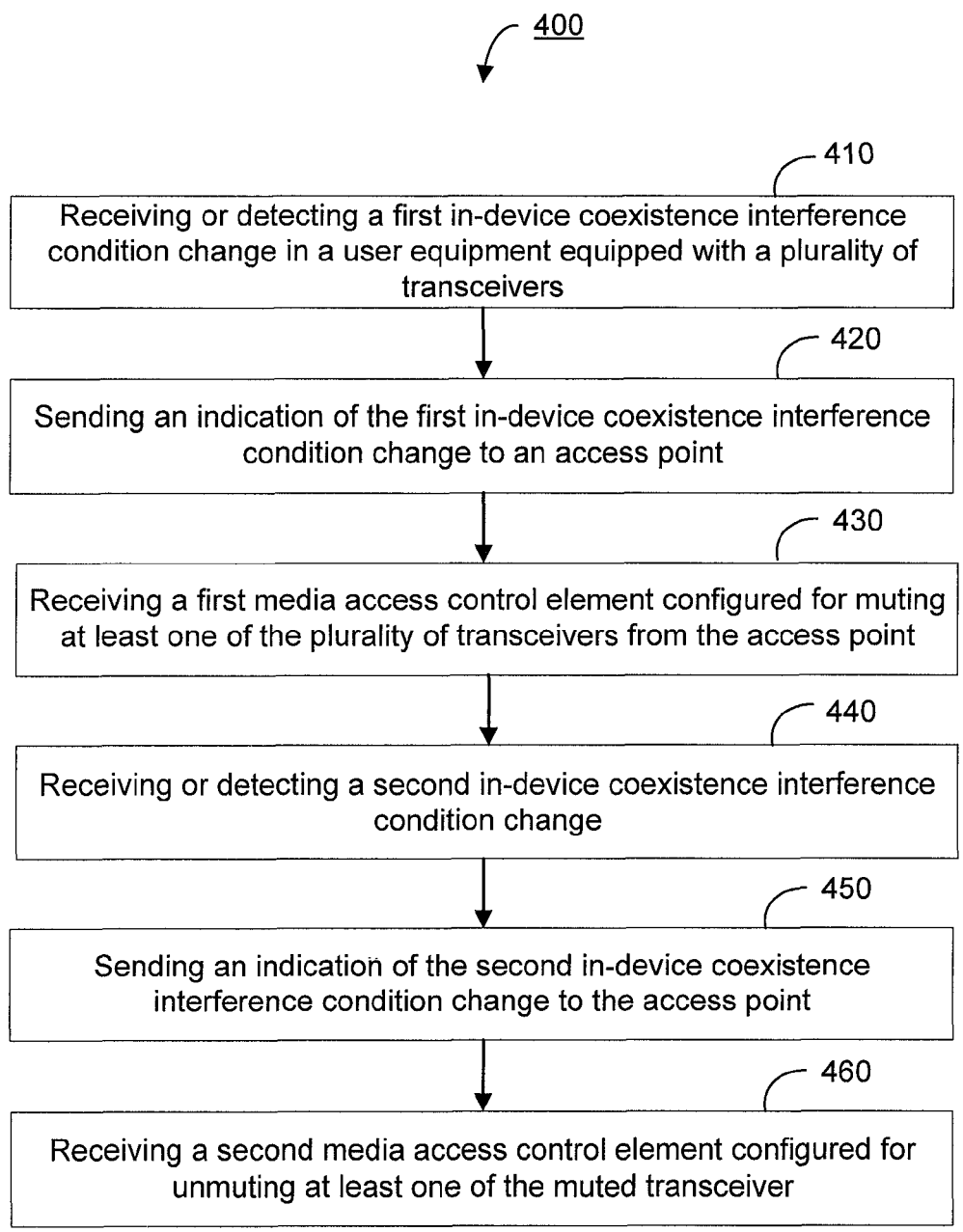
FIG. 4 is a logic flow diagram that illustrates the operation of a method, and a result of execution of computer program instructions embodied on a computer readable memory in a user equipment, in accordance with some example embodiments of this invention.

Now referring to FIGS. 4 thorough 8, example embodiments of this invention provide apparatus, methods, and computer programs that provide improved efficiency for managing Bluetooth (BT) in-device co-existence (IDC) with an LTE device, for example, employing predictable time division multiplexing (TDM) scheduling.

Figure 2:
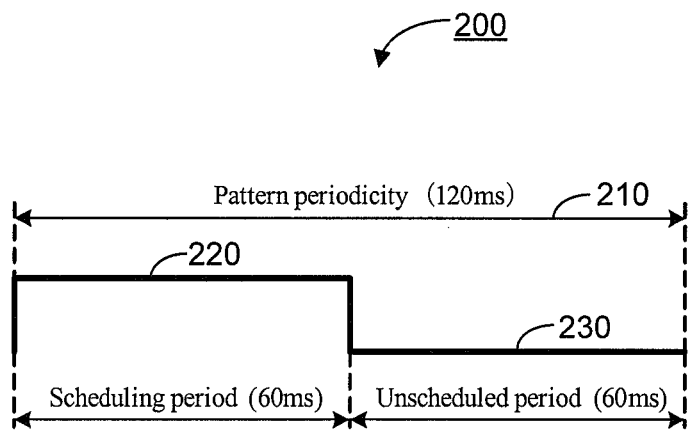
FIG. 2 reproduces FIG. 5.2.1.2.1-1 of 3GPP TS 36.816 and shows the desired time division multiplying (TDM) pattern generated by a user equipment and provided to an evolved Node B in a discontinuous reception (DRX) based solution.

Each of the above-mentioned example embodiments of the present invention include the common feature of detecting on-going and potential interference among co-located RATs in the UE and accord with the predictable TDM pattern shown in FIG. 2. With respect to the interference detection, some example embodiments of the present invention can adheres to the conditions of in-device coexistence (IDC) interfere described in sub-clause 5.2.1 of 3GPP TR 36.816 V 11.2.0 (December 2011). Other TDM pattern configurations are possible for handling IDC among co-located transceivers (some non-limiting examples are Zig-Bee and transceivers employing TV White space spectrum band) in a UE. In addition, other TDM pattern configurations are possible to allow co-located transceivers to cooperate or participate in a network managed by a coexistence discovery and information server in accordance with IEEE 802.19.1.

Set forth below as Table 1.1 is actually reproduced Table 5.2.1.A-1 from 3GPP TR 36.816 which serves as one non-liming example of conditions of IDC interference in some examples of the present invention.

TABLE 1.1

Conditions of in-device coexistence interference

| Scenario | Simple Description for each Scenario |
| --- | --- |
| 1 | On-going interference for each serving frequency |
| 2 | Potential interference (currently not on-going) on the serving frequency |

TABLE 1.1-continued

Conditions of in-device coexistence interference

| Scenario | Simple Description for each Scenario |
| --- | --- |
| 3 | On-going interference on non-serving frequencies |
| 4 | Potential interference (currently not on-going) on non-serving frequencies |

Referring now to FIG. 4, an example of a logic flow diagram that illustrates the operation of a method and a result of execution of computer program instructions in a user equipment embodied on a non-transitory computer readable memory is shown 400, in accordance with the some example embodiments of this invention. In the first step the method or computer program instruction in the UE receives or detects a IDC condition change indicating potential or ongoing interference among its multiple transceivers (at least a plurality of transceivers) configured for supporting multiple radio access technologies (RATs) (410). This interference can be for example between a co-located LTE transceiver and a BT/WiFi transceiver as shown in FIG. 1. The detection of DC conditions can be for example any of the four scenarios described in Table 1.1. For example, an indication of an IDC condition change can be obtained from powering on or powering off of each co-located transceiver or execution of various applications in the UE known to employ each transceiver type (for example, executing a telephone application would involve the LTE-A transceiver) could be detected in the UE. The IDC condition change may also be detected from a Bluetooth module also located in the UE. For example, information can be obtained from the BT module such as an indication of a BT sniff established or ended, or a SCO/eSCO link established or ended. An indication of an IDC interference condition change can also be received from a coexistence information obtained from a coexistence information and discovery server (CIDS) configured in accordance with IEEE 802.19.1 and operating in the LTE/LTE-A core network or operating remotely over the Internet.

In one embodiment, the UE (equipped with a BT module including a BT transceiver) can be informed that BT is exiting sniff mode (for example, leaving power saving mode in asynchronous connectionless (ACL) link) and will enter active mode or the UE can be informed from the BT module that a synchronous connection-oriented (SCO/eSCO) link has been initiated. The on-going BT interference can be determined, for example, based upon various reported information from the BT master transmitted with each LMP_sniff_req PDU (Some non-limiting examples are timing control flags, $D_{sniff}$, $T_{sniff}$, a $N_{sniff\_attempt}$ and $N_{sniff}$ timeout). Other non-limiting examples of BT parameters include SCO related parameters such as eSCO window, retransmission chance and the like. Alternatively, various statistical algorithms as known in the art (for example, inferential methods not limited to estimation, regression and correlation) can be applied to predict the potential interference of a co-located BT transceiver. The UE can be in either a master or slave in a piconet. The UE equipped with a BT operating as a master will initiate the start or end of the sniff mode, or SCO/eSCO session by notifying the BT slave. In one embodiment, the UE equipped with a BT operating as a slave will first receive notification from its master, and initiate the start or end of the sniff mode or SCO link accordingly.

In response to determining that an IDC interference condition change has occurred, the UE can inform an access point such as a base station or an evolved Node B (eNodeB)

(which the UE has already established a connection with) by sending a first indication of an IDC condition change to the AP (420). As disclosed in FIG. 5, the eNodeB is configured to receive the first indication of an IDC interference condition change from a plurality of UEs each equipped with multiple transceivers (at least a plurality of transceivers) (510).

Figure 5:
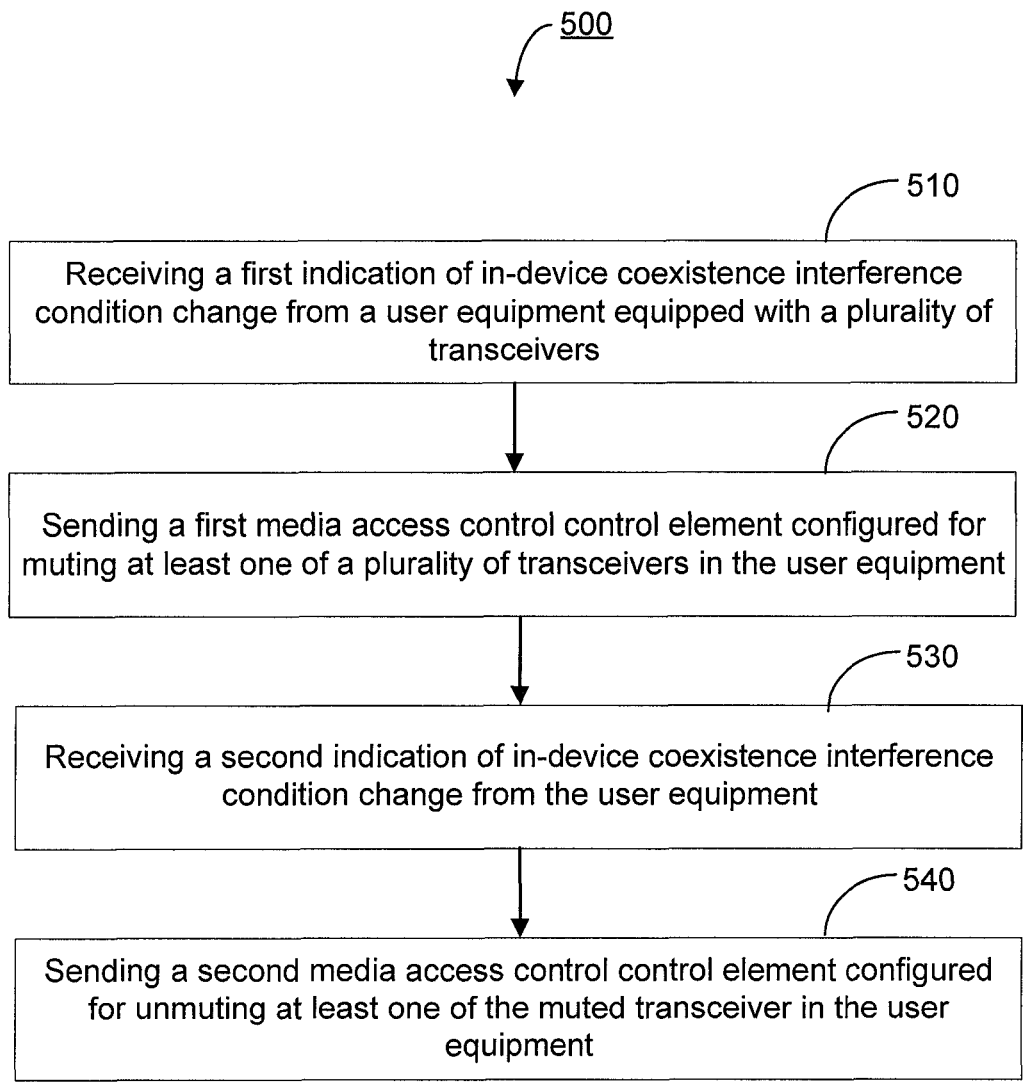
FIG. 5 is a logic flow diagram that illustrates the operation of a method, and a result of execution of computer program instructions embodied on a computer readable memory in a base station, access point, or evolved Node B, in accordance with some example embodiments of this invention.

In response to receiving the indication of an instance of IDC interference condition change, the AP can send (520) and the UE can receive (430) a first predetermined MAC CE configured for muting one of the multiple transceivers (at least a plurality of transceivers) in the UE as shown in both FIGS. 4 and 5. In one example of the present invention, the eNodeB can send and the UE can receive a MAC CE configured for muting an LTE/LTE-A transceiver for the duration of the BT active duration as shown and described below in FIG. 8.

In one embodiment of the present invention the UE employs a IDC Short DRX MAC CE configured for short discontinuous transmission (DRX) which is a newly defined LCID value (i.e. "IDC Short DRX") with a index number allocated to the LCID. In one non-limiting example embodiment, the allocated index number can be 01011. In another example embodiment, a periodical scheduled and unscheduled period of time division multiplexing is configured beforehand (e.g., by RRC signaling) where each MAC CE can be used to start or end this DRX pattern. One possible and non-limiting example is the pattern periodicity 210 shown in FIG. 2.

An alternative embodiment of the present invention can utilize a measurement gap (MG) pause instead of a short DRX as such this embodiment employs a DC MG pause MAC CE. In another example embodiment, a periodical scheduled and unscheduled period of time division multiplexing is configured beforehand (e.g., by RRC signaling) where each MAC CE can be used to start or end a MG pause. One possible and non-limiting example is the pattern periodicity 210 shown in FIG. 2.

Next, the UE will receive or receiver a second IDC interference change condition (440). This indication of IDC interference condition change can similarly be obtained from the Bluetooth module as described above. For example, information obtained from the BT module indicating the BT sniff ended, or a SCO/eSCO link has been established. Alternatively, a second indication of IDC interference condition change can be obtained from the BT module information in the LMP_unsniff_req PDU. Other indications of IDC interference condition change can also be obtained from signals indicating a powering on or powering off of other co-located transceivers (at least a plurality of transceivers) or execution of various applications known to utilize those transceivers. In addition, information can be obtained from a coexistence information and discovery server configured in accordance with IEEE 802.19.1.

After receiving or detecting the second indication of IDC interference, the UE sends (450) and an access point such as a base station or an evolved Node B (eNodeB) (530) receives the indication of the second IDC interference condition change as shown in both FIGS. 4 and 5. In response to receiving the second indication of IDC interference, the eNodeB sends (540) and the UE receives (460) an DC Short DRX or DC MG pause MAC CE configured for unmuting the previously muted transceiver (at least a plurality of transceivers). Some example embodiments of the present invention disclose that the LTE/LTE-A transceiver is unmuted.

Figure 6:
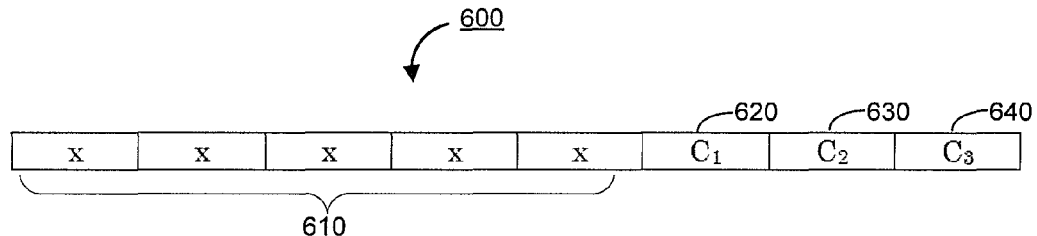
FIG. 6 illustrates a media access control (MAC) control element (CE) configured for indicating a short discontinuous reception (DRX) or measurement gap (MG) pattern in accordance with embodiments of the present invention.

Referring now to FIG. 6, a MAC CE byte 600 is shown in accordance with some example embodiments of the invention. As shown in FIG. 6, within the newly created MAC CE byte, the first five bits 610 are used to indicate the LCD value (for example 01011). As noted above, under sub-clause 6.2.1 and Table 6.2.1-1 therein of 3GPP TS 36.321 V. 10.5.0 index number 01011 is currently "reserved." Accordingly, this embodiment would require a change to the standard. The remaining three leftover bits (i.e., $C_3$, $C_2$, $C_1$) 620, 630 and 640 can be used to indicate pause/restart of RRC preconfigured/configuration pattern for a short DRX or MG pause. In such case, RRC configuration/de-configuration is necessary when the time division duplex (TDD) configuration changes or the BT type changes. Alternatively, the patterns could be selected by eNoBe based on such non-limiting examples as the TDD configuration, BT node type (e.g. master/slave), or due to scheduling restriction in the network, and the like. The patterns can be conveyed to the UE together with pause/start bit in the MAC CE byte 600. Accordingly, in the event that the TDD configuration or master/slave relationship change there may not be need to configure and/or reconfigure the RRC signaling. In another example embodiment, a longer MAC CE (more than 1 byte) may be defined if necessary to accommodate additional content.

Figure 7:
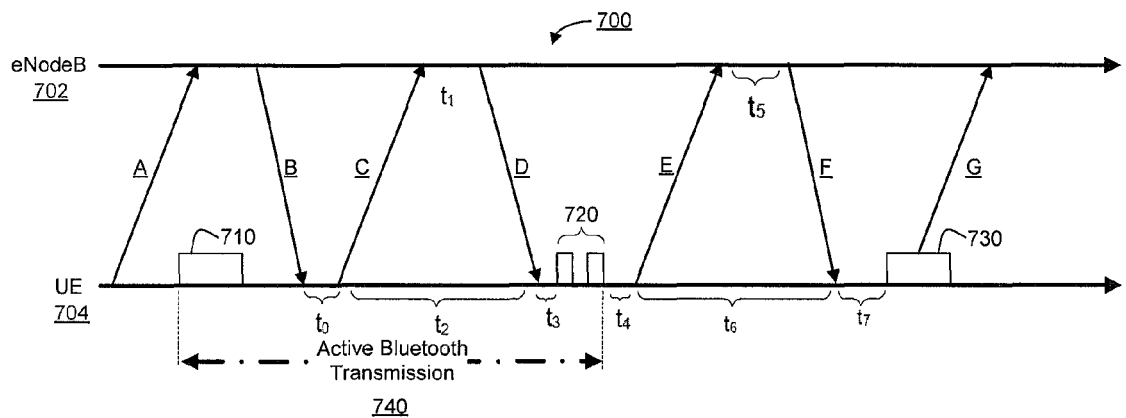
FIG. 7 illustrates a timing diagram between an evolved Node B (eNodeB) and a user equipment (UE) in accordance with an existing method known in the prior art.
Figure 8:
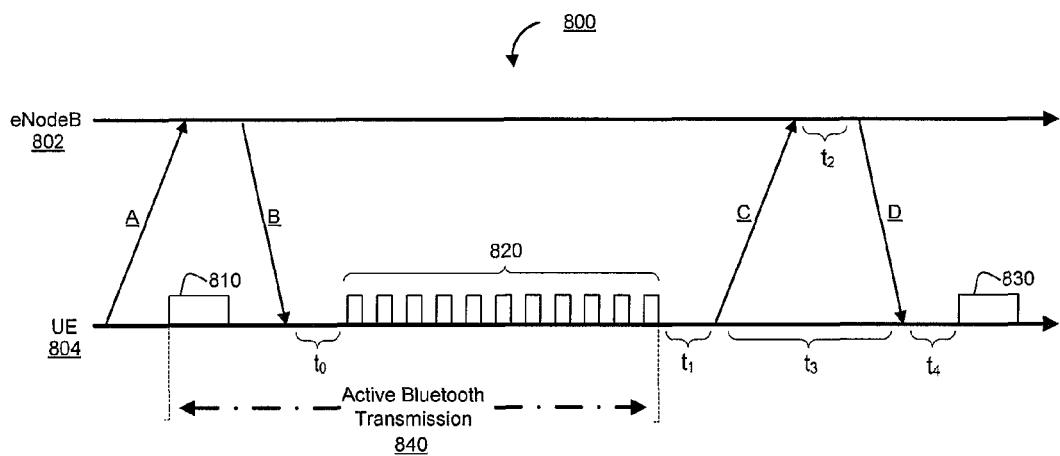
FIG. 8 illustrates a timing diagram between an evolved Node B (eNodeB) and a user equipment (UE) in accordance with embodiments of the present invention.

Referring now to FIGS. 7 and 8, a timeline analysis of existing TDM methods to accommodate IDC among BT and LTE transceivers and the methods, and computer program instruction of the present invention are shown. As shown in FIG. 7, the prior art methods 700 may be slower and may require more signaling than the present invention, for example. For example as shown in FIG. 7, the UE 704 (which is equipped either a BT master or slave) receives information that BT is leaving the power saving mode in the Asynchronous Connectionless (ACL) link, or will start the Synchronous Connection-Oriented (SCO) link (not shown). In such a situation the UE 704 may or may not be executing long DRX mode 710. In FIG. 7 the UE 704 is engaged in long DRX mode 710. Accordingly, the UE will inform the eNodeB 702 with signaling A such as sending a DRX command to the UE (i.e., instruction to start the long DRX). Then eNodeB 702 will configure the long DRX 710 with RRC signaling and send the information back to the UE via signal B (i.e., RRC_reconfig). In response to signal B, the UE 704 will acknowledge signaling as indicated by signal C by sending RRC_reconfig_complete back to eNodeB 702. Then, the eNodeB 702 will send a second MAC CE to the UE to start the short DRX timer (not shown) with signaling D. After that, the UE 702 initiates a short DRX (720). After the active BT transmission session 740 expires, the UE 704 will trigger an end to SCO link, or enter power saving mode, with signaling E to the eNodeB 702. Then the eNodeB 702 will deconfigure short DRX 720 with signaling F, and the UE 704 will acknowledge signaling G by RRC_reconfig_complete back to the eNodeB 702. Then UE 704 returns back to long DRX mode (730).

Referring now to FIG. 8 which illustrates employing the DC short DRX or DC MG pause MAC CE 800 in accordance with some example embodiments of the present invention. In FIG. 8, signaling A is the same as in FIG. 7. However, with respect to subsequent signaling, the eNodeB 802 in signal B will transmit a new MAC CE signaling, incorporating either a set short DRX LCD value and index, or an MG pause employing the LCD and a fixed pattern as described above with respect to the method and computer program instruction. As such, a short DRX 820 or an MG pause 820 are activated without a timer during the active BT transmission 840. After the active BT session 840 expires, the UE 804 will trigger an end to SCO link, or enter power saving mode, with signaling C transmitted to the eNodeB 802. Then the eNodeB 802 will end short DRX 820 or MG pause 820 with new MAC CE via signaling of D.

As can be seen in by comparing FIGS. 7 and 8, there are more delays in FIG. 7 ($t_0$, $t_1$, $t_2$, $t_3$, $t_4$, $t_5$, $t_6$ and $t_7$) than FIG. 8 ($t_0$, $t_1$, $t_2$, $t_3$, and $t_4$) between each signaling due to the fact that eNodeB 702 or UE 704 require more processing in the prior art. However, compared to FIG. 8, some embodiments of the present invention avoid unnecessary signaling, resulting in an increase in duration of good co-existence (for example short DRX or MG pause 820 can be increased) (820 compared to 720), for example. The active BT transmission sessions 740 and 840 are assumed to have the same duration with in both FIGS. 7 and 8.

Figure 9:
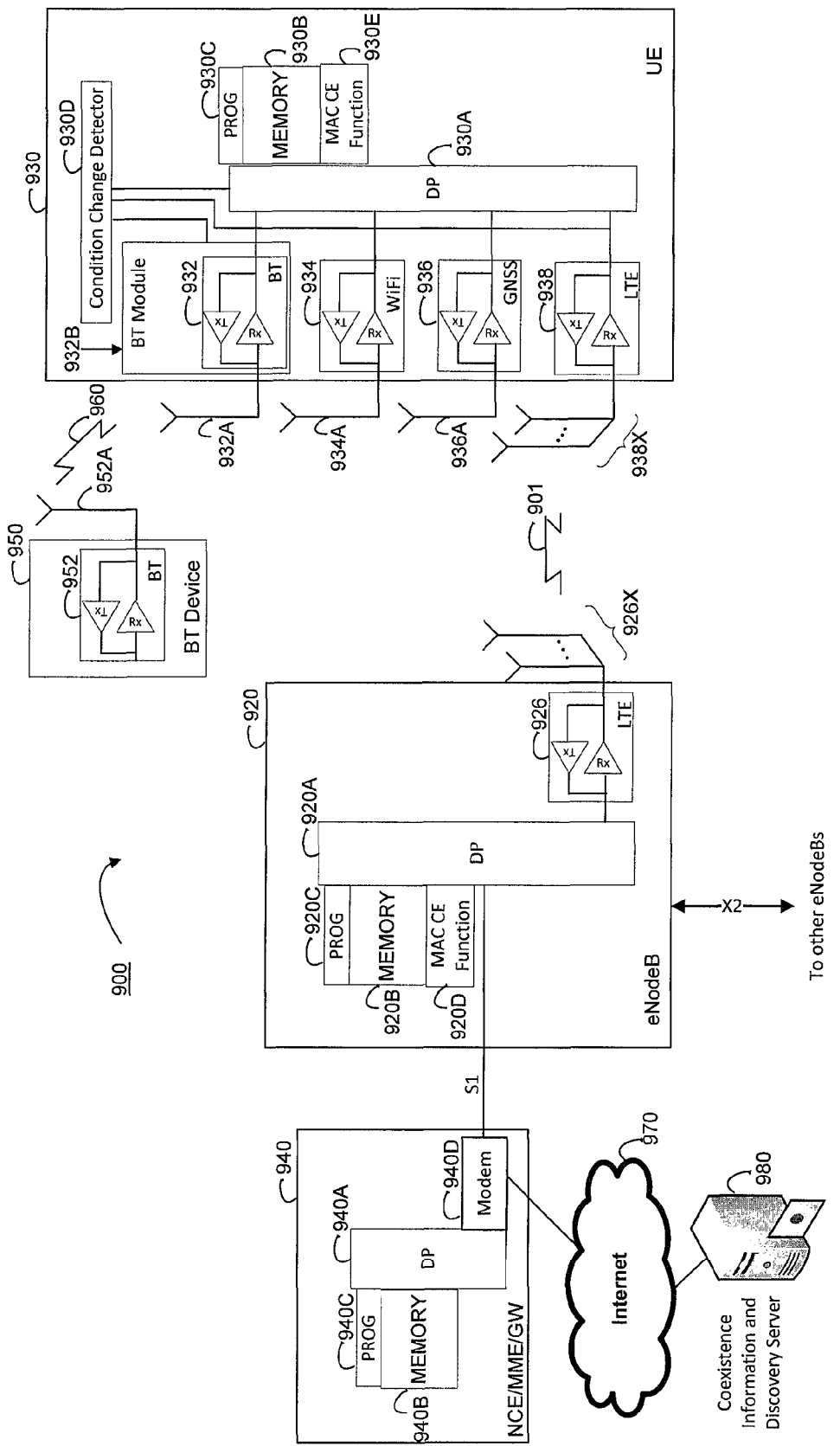
FIG. 9 is a simplified block diagram of various network devices such as a user equipment (UE) and evolved Node B (eNodeB), which are example electronic devices suitable for use in practicing some example embodiments of the invention.

Reference is now made to FIG. 9 which shows an example of a simplified block diagram of various electronic devices and apparatuses 900 that are suitable for use in practicing some example embodiments of this invention. In FIG. 9, a first access node 920 is adapted for communication over a wireless link 901 with a mobile apparatus, such as a mobile terminal or LIE 930. The apparatus 930 may comprise a mobile phone, smart phone, laptop computer or tablet computer and the like. The first access node 920 may be a macro eNodeB, a wireless local area network (WLAN) access point (AP), a femto eNodeB, or other type of base station (BS) or access point (AP).

For completeness, the LIE 930 includes a processor, such as at least one data processor (DP) 930A, a memory (such as at least one computer-readable memory (MEMORY) 930B storing at least one computer program (PROG) 930C, and also a plurality of radio access communication modules (932, 934, 936, 938). In FIG. 9, UE 930 includes a Bluetooth transceiver 932, Wifi transceiver 934, a global navigation satellite system (GNSS) transceiver 936 and a cellular transceiver 938. The description below of some example embodiments of the apparatus of the invention include, several components such as transceivers and antennas which are not necessary for carrying out some embodiments of the invention but are provided for completeness. Each transceiver includes a transmitter, TX, and a receiver, RX, for bidirectional wireless communications. For example, the BT transceiver 932 includes antenna 932A for communicating with a BT device 950 via wireless link 960. It should be noted that some devices are so small or have a form factor which precludes an antenna. BT 950 can be a wireless headset, earphone or other multimedia device and includes a BT transceiver 952 and antenna 952A. Wifi transceiver 934 can also can have an antenna 934A. It should be noted that some apparatuses carrying out some embodiments of the invention may not include any antennas or any transceivers. The GNSS transceiver can also contains an antenna 936A for wirelessly communicating with a global satellite network (not shown). It should be noted that some devices are so small or have a form factor which precludes an antenna. Cellular transceiver 938 can wirelessly communicates with the first access node 920 via one or more antennas 938X. Cellular transceiver 938 is shown in FIG. 9 as a non-limiting example of a long term evolution (LTE) or long term evolution advanced (LTE-A) transceiver for use in some example embodiments of the present invention. A long term evolution or long term evolution advanced transceiver can be any transceiver, such non-limiting examples include any other transceiver capable of communicating with a universal mobile telecommunications system (UMTS), an evolved universal mobile telecommunications terrestrial radio access network (eUTRAN), a universal terrestrial radio access network (UTRAN) and the like. Alternatively, cellular transceiver 938 can be a global system for mobile communications (GSM) transceiver, a wideband code division multiple access (WCDMA) transceiver or a high speed packet access (HSPA) transceiver. UE 930 includes at least one of the PROGs 930C to allow the UE to enable a short DRX or an MG pause during a BT activation period employing the MAC CE function 930E in accordance with the above described methods and computer program instructions in accordance with one or more embodiments of the present invention. Also, UE includes an in-device coexistence (IDC) condition change detector 930D which is capable of monitoring the change of condition of events reported from a BT module 932B, other in-device transceivers (934, 946, and 948), as well as information obtained from a coexistence information and discovery server (CIDS) 980 which can be located remotely over the Internet 970 and coupled to the network core element/mobility management entity/gateway (NCE/MME/GW) 940.

The first access node 920 similarly includes processor, such as at least one data processor (DP) 920A a storing device, such as at least one computer-readable memory (MEMORY) 920B which stores at least one computer program (PROG) 920C. The first access node 920 also includes communicating means such as cellular transceiver 926 which includes a transmitter TX and a receiver RX for bidirectional wireless communications with the UE 930 via one or more antennas 926X. Cellular transceiver 928 is shown in FIG. 9 as a non-limiting example of a long term evolution (LTE) or long term evolution advanced (LTE-A) transceiver for use in some example embodiments of the present invention. A long term evolution or long term evolution advanced transceiver can be any transceiver, such non-limiting examples include any other transceiver capable of communicating with a universal mobile telecommunications system (UMTS), an evolved universal mobile telecommunications terrestrial radio access network (eUTRAN), a universal terrestrial radio access network (UTRAN) and the like. Alternatively, cellular transceiver 928 can be a a global system for mobile communications (GSM) transceiver, a wideband code division multiple access (WCDMA) transceiver or a high speed packet access (HSPA) transceiver. First access node 920 also includes at least one of the PROGs 920C and a MAC CE function 920D to allow it to send a MAC CE, including an start/stop IDC short DRX or start/stop MG pause to the UE 930 carry out the above described methods and computer program operations in accordance with one or more embodiments of the present invention. Also as shown in FIG. 9 is a data and/or control path S1 which couples the first access node 920 with network core element/mobility management entity/gateway NCE/MME/S-GW 940.

Network core element/mobility management entity/gateway NCE/MME/S-GW 940 includes processor (such as at least one data processor (DP) 940A, a storing device, (such as at least one computer-readable memory (MEMORY) 940B stores at least one computer program (PROG) 940C, and a communicating device (such as a modem 940D for bidirectional communication with the first access node 920 via the link S1). In addition, the network core element/ mobility management entity/gateway NCE/MME/S-GW 940 can be coupled to the Internet 970 and further coupled to a coexistence information and discovery server (CIDS) 980. While not particularly illustrated for the UE 930, or first access node 920, those devices also are included as part of their wireless communicating device, a modem which may be inbuilt on a radio frequency RF front end chip within those devices 926, 936, and 938 and which chip also carries the TX and the RX. The network core element/mobility management entity/gateway NCE/MME/S-GW 940 also includes local memory 940B which is a database (e.g. subscriber information).

In these regards, the example embodiments of this invention may be implemented at least in part by computer software stored on the MEMORYs 920B and 930B which is executable by the DP 930A and/or by the DP 920A of the access node 920 or UE 930, or by hardware, or by a combination of tangibly stored software and hardware (and tangibly stored firmware). Electronic devices implementing these aspects of the invention need not be the entire devices as depicted at FIG. 9, but example embodiments may be implemented by one or more components of same, such as the above-described tangibly stored software, hardware, firmware and DP, or a system on a chip SOC or an application specific integrated circuit ASIC.

Various embodiments of the computer readable MEMORYs 920B, 930B, and 940B include any data storage technology type which is suitable to the local technical environment, including, but not limited to, semiconductor based memory devices, magnetic memory devices and systems, optical memory devices and systems, fixed memory, removable memory, disc memory, flash memory, DRAM, SRAM, EEPROM and the like. Various embodiments of the DPs 920A, 930A and 940A include, but are not limited to, general purpose computers, special purpose computers, microprocessors, digital signal processors (DSPs) and multi-core processors.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

Further, some of the various features of the above non-limiting embodiments may be used to advantage without the corresponding use of other described features. The foregoing description should therefore be considered as merely illustrative of the principles, teachings and example embodiments of this invention, and not in limitation thereof.

What is claimed is:

1. An apparatus, comprising:
   circuitry configured to
   receive or detect a first in-device coexistence interference condition change in a user equipment equipped with a plurality of transceivers;
   control sending an indication of the first in-device coexistence interference condition change to an access point;
   control receiving a first media access control element configured for muting at least one of the transceivers;
   receive or detect a second in-device coexistence interference condition change;
   send an indication of the second in-device coexistence interference condition change to the access point;
   receive a second media access control element configured for unmuting at least one of the muted transceivers; and
   unmute the at least one of the muted transceivers based on the received second media access control element.

2. The apparatus of claim 1, wherein the condition of in-device coexistence interference relates to interference among a cellular transceiver and a Bluetooth transceiver in the same user equipment.

3. The apparatus of claim 2, wherein the cellular transceiver is a long term evolution transceiver, a long term evolution advanced transceiver, a wideband code division multiple access transceiver, or a high speed packet access transceiver.

4. The apparatus of claim 1, wherein the first media access control element is configured to promote short discontinuous transmission during a condition of in-device coexistence interference.

5. The apparatus of claim 4, wherein short discontinuous transmission during in-device coexistence interference is allocated a logical channel identity and index bits associated with a pause and start configuration pattern for short discontinuous transmission.

6. The apparatus of claim 5, wherein the index bits indicate a pause and. stop pattern attributable to a time division duplex configuration, a. Bluetooth master or slave type, or network schedule.

7. The apparatus of claim 6, wherein a short discontinuous transmission timer is not employed.

8. The apparatus of claim 1, wherein the first media access control element is configured to promo e a measurement gap pause during a condition of in-device coexistence interference.

9. The apparatus of claim 8, wherein the measurement gap pause during in-device coexistence interference is allocated a logical channel identity, and index bits associated with a pause and start of configuration measurement gap pattern.

10. The apparatus of claim 9, wherein index bits indicate a pause and start measurement gap pattern attributable to a time division duplex configuration, Bluetooth master or slave type, or network schedule.

11. The apparatus of claim 1, wherein at least one of the first in-device coexistence interference change condition or the second in-device coexistence interference change condition is received from a coexistence information and discovery server.

12. An apparatus comprising:
    circuitry configured to
    receive or detect an in-device coexistence interference condition change in a user equipment equipped with a plurality of transceivers;
    send an indication of the in-device coexistence interference condition change to an access point; and
    receive a media access control element configured for muting at least one of the transceivers, wherein the condition of in-device coexistence interference relates to interference among a cellular transceiver and a Bluetooth transceiver in the user equipment, and the condition of in-device coexistence interference from the Bluetooth transceiver comprises at least one of:

on-going interference from a Bluetooth transceiver where the interference is detected based upon information contained in a sniff request or a synchronous connection oriented (SCO) link request; or potential interference detected based upon statistical analysis of the information contained in a sniff request or a SCO link request.

13. A method comprising:

receiving or detecting a first in-device coexistence interference condition change in a user equipment equipped with at least a plurality of transceivers;

sending an indication of the first in-device coexistence interference condition change to an access point;

receiving a first media access control element configured for muting at least one of the transceivers;

receiving or detecting a second in-device coexistence interference condition change;

sending an indication of the second in-device coexistence interference condition change to the access point; and receiving a second media access control element configured for unmuting at least one of the muted transceivers; and unmuting the at least one of the muted transceivers based on the received second media access control element.

14. An apparatus comprising:

circuitry configured to receive a first indication of in-device coexistence interference condition change from a user equipment equipped with a plurality of transceivers;

send a first media access control clement configured for muting at least one of the plurality of transceivers in the user equipment;

receive a second indication of in-device coexistence interference condition change from the user equipment; and send a second media access control element configured for unmuting at least one of the muted transceivers.

15. The apparatus of claim 14, wherein the first media access control element is configured to promote short discontinuous transmission during a condition of in-device coexistence interference.

16. The apparatus of claim 15, wherein the first media access control element is configured to indicate one or more patterns based upon a time division duplex configuration, a Bluetooth node type, or due to a scheduling restriction in a cellular network.

17. The apparatus of claim 14, wherein the first media access control element is configured to promote a measurement gap pause during a condition of in-device coexistence interference.

* * * * *

UNITED STATES PATENT AND TRADEMARK OFFICE
CERTIFICATE OF CORRECTION

PATENT NO. : 9,532,245 B2
APPLICATION NO. : 14/400284
DATED : December 27, 2016
INVENTOR(S) : Na Wei et al.

It is certified that error appears in the above-identified patent and that said Letters Patent is hereby corrected as shown below:

In the Claims

Column 14, Line 43, change "promo e" to --promote--.

Column 15, Line 23, delete "and" after "point;".

Column 16, Line 6, change "clement" to --element--.

Signed and Sealed this
Third Day of April, 2018

Andrei Iancu
*Director of the United States Patent and Trademark Office*